(12) United States Patent
Seurre et al.

(10) Patent No.: US 7,680,058 B2
(45) Date of Patent: Mar. 16, 2010

(54) METHOD OF CONFIGURING PARAMETERS FOR DATA PACKET TRANSMISSION

(75) Inventors: Emmanuel Seurre, Aulnay sur Mauldre (FR); Stéphane Castagnet, Noisy le Grand (FR)

(73) Assignee: ALCATEL, Paris (FR)

( * ) Notice: Subject to any disclaimer, the term of this patent is extended or adjusted under 35 U.S.C. 154(b) by 1701 days.

(21) Appl. No.: 10/471,402

(22) PCT Filed: Mar. 14, 2002

(86) PCT No.: PCT/FR02/00909

§ 371 (c)(1),
(2), (4) Date: Sep. 10, 2003

(87) PCT Pub. No.: WO02/076125

PCT Pub. Date: Sep. 26, 2002

(65) Prior Publication Data

US 2004/0076137 A1    Apr. 22, 2004

(30) Foreign Application Priority Data

Mar. 15, 2001   (FR) .................................. 01 03525

(51) Int. Cl.
*H04L 12/12* (2006.01)
(52) U.S. Cl. ...................... 370/252; 370/311
(58) Field of Classification Search ................ 370/252, 370/311, 254, 389, 401; 455/432, 557–559
See application file for complete search history.

(56) References Cited

U.S. PATENT DOCUMENTS

| | | | | |
|---|---|---|---|---|
| 5,479,480 A * | 12/1995 | Scott | ................. | 455/425 |
| 5,487,175 A * | 1/1996 | Bayley et al. | ................. | 455/422.1 |
| 5,533,019 A * | 7/1996 | Jayapalan | ................. | 370/352 |
| 5,590,406 A * | 12/1996 | Bayley et al. | ................. | 370/493 |
| 5,602,869 A * | 2/1997 | Scott | ................. | 375/222 |
| 5,666,355 A * | 9/1997 | Huah et al. | ................. | 370/311 |
| 5,862,474 A * | 1/1999 | Kimball | ................. | 455/418 |
| 5,907,815 A * | 5/1999 | Grimm et al. | ................. | 455/557 |
| 5,956,651 A * | 9/1999 | Willkie et al. | ................. | 455/553.1 |
| 5,978,688 A * | 11/1999 | Mullins et al. | ................. | 455/557 |
| 6,088,600 A * | 7/2000 | Rasmussen | ................. | 455/574 |
| 6,104,929 A * | 8/2000 | Josse et al. | ................. | 455/445 |
| 6,167,280 A * | 12/2000 | Barrett et al. | ................. | 455/466 |
| 6,195,564 B1 * | 2/2001 | Rydbeck et al. | ................. | 455/557 |
| 6,243,579 B1 * | 6/2001 | Kari | ................. | 455/426.1 |
| 6,337,989 B1 * | 1/2002 | Agin | ................. | 455/522 |
| 6,377,803 B1 * | 4/2002 | Ruohonen | ................. | 455/434 |
| 6,463,055 B1 * | 10/2002 | Lupien et al. | ................. | 370/353 |
| 6,529,743 B1 * | 3/2003 | Thompson et al. | ................. | 455/557 |
| 6,628,966 B1 * | 9/2003 | Nagata | ................. | 455/557 |
| 7,020,102 B2 * | 3/2006 | Tuomainen et al. | ................. | 370/311 |
| 7,042,855 B1 * | 5/2006 | Gilchrist et al. | ................. | 370/328 |
| 2003/0060244 A1 * | 3/2003 | Ruohonen | ................. | 455/574 |
| 2004/0100940 A1 * | 5/2004 | Kuure et al. | ................. | 370/349 |
| 2004/0103201 A1 * | 5/2004 | Oh | ................. | 709/228 |
| 2006/0203787 A1 * | 9/2006 | Grech et al. | ................. | 370/338 |

FOREIGN PATENT DOCUMENTS

EP        1 107 626 A2   6/2001
WO     WO 97/37504 A    10/1997

\* cited by examiner

*Primary Examiner*—Ricky Ngo
*Assistant Examiner*—Ben H Liu
(74) *Attorney, Agent, or Firm*—Sughrue Mion, PLLC

(57) ABSTRACT

The present invention relates to a method of configuring parameters used to transmit packets of data between a data processing and/or transfer terminal, such as a computer or the like, for example, and a radiocommunication network, using a radiocommunication device, in particular a mobile station with an autonomous power supply.

The method is characterized in that it consists in authorizing dynamic configuration by the transfer and/or processing terminal of parameters defining a discontinuous reception mode of said radiocommunication device when in a standby mode, after static setting of said parameters by said device, as a function of the autonomy of said device, the responsiveness required of said device, and transmission requirements of said terminal.

9 Claims, No Drawings

METHOD OF CONFIGURING PARAMETERS FOR DATA PACKET TRANSMISSION

BACKGROUND OF THE INVENTION

The field of the invention is that of transmission of data by radio, in particular in a Global System for Mobile communications (GSM) network, and in relation to the General Packet Radio Service (GPRS) standard, and consists in a method of dynamic configuration of the parameters used for this kind of transmission.

In GPRS or GSM applications, mobile stations and like radiocommunication devices can be used as modems or as analog interface and transfer devices to transmit data between a radiocommunication network to which said devices can connect and a data processing unit or terminal, such as a computer, in particular a personal computer, which is either isolated or networked with other computers.

In such applications, after completing an uplink transmission sequence, for example, the device may end up waiting for a return downlink transmission, a confirmation, or some other message from the network.

A similar situation can arise if the radiocommunication device is in the phase of searching for a connection to a suitable network, and in particular its own network, as described in the document EP-A-0 603 050 in particular.

The conditions applying to, and the execution of, this active waiting state, and in particular the listening and verification operations carried out by the radiocommunication device, either continuously or repetitively, at regular or irregular intervals, are defined by discontinuous reception (DRX) parameters imposed by the network and using the International Mobile Subscriber Identity (IMSI).

These parameters, the value or the state of which must be set to define how the device listens to the network, include in particular the "SPLIT-PG-CYCLE" parameter (period of search or packet call waiting messages), the "SPLIT on CCCH" indicator (indicating the DRX method used: GSM or GPRS), and the "non DRX timer" parameter (existence or non-existence of a continuous listening state and, where applicable, duration of that state after a data transmission phase).

The values of the parameters previously cited are set by the radiocommunication device, in accordance with the GPRS standard, during GPRS attachment or GPRS location procedures, and once and for all for a given application.

The configuration of the DRX parameters is the result of a compromise between the effective or required autonomy of the radiocommunication device (with autonomous power supply) and the degree of responsiveness necessary or required of the device in terms of call and search requests and/or a downlink transfer.

A different and specific compromise can be defined for each GPRS application. In some cases, the responsiveness factor takes priority over the autonomy factor, whereas in other cases the autonomy factor is more decisive than the responsiveness factor.

Consequently, applications installed on a computer or like terminal and using a GPRS medium cannot at present carry out any modification of said DRX parameters.

Now there may be a requirement to provide the possibility of reconfiguring the DRX parameters after their original configuration, for example because of an intentional or unintentional modification of the priorities of the factors previously cited that are relevant, or a change in transmission conditions, to which only the terminal or the computer may be sensitive.

SUMMARY OF THE INVENTION

One particular object of the present invention is to meet this requirement.

To this end, it provides a method of configuring parameters used to transmit packets of data between a data processing and/or transfer terminal, such as a computer or the like, for example, and a radiocommunication network, using a radiocommunication device, in particular a mobile station with an autonomous power supply, which method is characterized in that it consists in authorizing dynamic configuration by the transfer and/or processing terminal of parameters defining a discontinuous reception mode of said radiocommunication device when in a standby mode, after static setting of said parameters by said device, as a function of the autonomy of said device, the responsiveness required of said device (regarding response to incoming calls), and transmission requirements of said terminal.

DETAILED DESCRIPTION OF THE INVENTION

In a preferred embodiment of the invention, the parameters concerned correspond to DRX parameters defining the conditions of discontinuous reception and of listening to the network by the radiocommunication device when the device is not in a communication mode.

The configuration of said DRX parameters by the terminal advantageously comprises the steps of:

setting the specific value of each DRX parameter in said terminal, transmitting said specific values from the terminal to the radiocommunication device, and starting a location request procedure in said radiocommunication device, in order to communicate the specific values of the DRX parameters to the network from the terminal.

The location request procedure is launched, in order to modify the DRX parameters, even if the location of the mobile radiocommunication device has not changed (in terms of the identity of the user or the identity of the area or place).

Taking into consideration the fact that DRX information element (DRX IE—see 3GPP Recommendation 24.008) parameters are included in GPRS Mobility Management (GMM—see 3GPP Recommendation 24.008) signaling messages exchanged between the radiocommunication device and the serving GPRS support node (SGSN), the formats of the parameters whose values are transmitted from the terminal to the radiocommunication device correspond to the formats of the parameters exchanged between said device and the SGSN and those set by 3GPP Recommendation 24.008.

The parameters previously cited include at least one field setting the period for listening by the radiocommunication device for incoming calls when the device is not in the continuous listening mode ("SPLIT-PG-CYCLE": one byte—value from 0 to 352), an indicator signaling which DRX method is used: GSM or GPRS ("SPLIT on CCH": Boolean), and a field indicating the period during which the device is listening continuously after completing a packet transfer ("non-DRX timer": 3 bits—no non-DRX mode after a transfer state, 1 s (second), 2 s, 4 s, 8 s, 16 s, 32 s, 64 s).

The present invention also provides a system for transmitting data packets from a data processing and/or transfer terminal, such as a computer or the like, to a telecommunication network via a radiocommunication device able to connect to said network, in particular a mobile station with an autonomous power supply, which system is characterized in that the parameters defining said transmission are configured by means of the method described hereinabove, in particular with regard to the DRX parameters.

Finally, the present invention also provides a radiocommunication device, of the mobile station or mobile telephone type, with an autonomous power supply, characterized in that it is adapted to be used in a transmission system as referred to hereinabove.

A concrete example of the application of the configuration method explained hereinabove is described next.

In connection with the following description, it must be remembered that the GPRS transmission mode is related to the computing principle known as a "client/server relationship".

In a client situation, the mobile is configured to set up connections to the Internet, an Intranet, databases, or the like. In a server situation, the mobile can be connected to a stand-alone weather station, a surveillance camera, or the like.

In the situation where the mobile is the client, it generates outgoing calls but in theory should not receive any incoming calls. The mobile sends requests to the network server and awaits responses to the requests. With regard to his mobile, the user then gives the autonomy factor priority over the factor of periodic listening to the network for incoming calls. Incoming radiocommunication connection requests are always made after the mobile sends a request. Accordingly, to palliate weak periodic listening to the network, it suffices for the mobile to be programmed for continuous listening, and not in DRX mode, following a packet transfer in an extended time period before being switched to discontinuous listening, in DRX mode.

The user configures the mobile via the PC by sending a command AT to request the longest possible period of listening to the network for incoming calls and to request a longer period for continuous listening to the network after a packet transfer. Remember that periodic listening to the network for incoming calls is crucial in relation to the standby time of the mobile.

In the situation where the mobile is the server, it is likely to receive incoming calls in order for it to execute requests from the remote client. For this type of server application, the mobile can use a battery connected to the AC mains or a mechanism freeing it of autonomy problems. The user gives his mobile priority for the factor of periodic listening to the network for incoming calls over the autonomous operation factor. Thus the user configures the mobile via the PC by sending a command AT to request the shortest possible period of listening to the network, i.e. short time intervals between two consecutive listening operations.

Of course, the invention is not limited to the embodiment described, which can be modified without this departing from the scope of the protection of the invention, in particular from the point of view of the composition of the various components or by substituting technical equivalents.

The invention claimed is:

1. A method of configuring parameters used to transmit packets of data between a terminal and a radiocommunication network, using a radiocommunication device comprising a mobile station with an autonomous power supply, which method is characterized in that it comprises the steps of authorizing dynamic configuration by the terminal of parameters defining a discontinuous reception mode of said radiocommunication device when in a standby mode, after static setting of said parameters by said device, as a function of the autonomy of said device, the responsiveness required of said device, and transmission requirements of said terminal, wherein said parameters correspond to DRX parameters defining the conditions of discontinuous reception and of listening to the network by the radiocommunication device when the device is not in a communication mode, and wherein said dynamic configuration of said parameters by said terminal comprises the steps of (i) setting the specific value of each DRX parameter in said terminal, (ii) transmitting said specific values from the terminal to the radiocommunication device, and (iii) starting a location request procedure in said radiocommunication device, in order to communicate the specific values of the DRX parameters to the network from the terminal.

2. A method according to claim 1, characterized in that the formats of the parameters whose values are transmitted from the terminal to the radiocommunication device correspond to the formats of parameters exchanged between said device and the serving GPRS support node (SGSN).

3. A method according to claim 1, characterized in that the formats of the parameters whose values are transmitted from the terminal to the device correspond to those set in 3GPP Recommendation 24.008.

4. A method according to claim 1, characterized in that the parameters comprise at least a field setting the period of listening for incoming calls, verifications effected by the radiocommunication device when the radiocommunication device is not listening continuously, an indicator indicating which discontinuous reception method is used, and a field indicating the period during which the device is listening continuously after completion of a packet transfer.

5. A system for transmitting data packets from a terminal to a telecommunication network via a radiocommunication device able to connect to said network, said device comprising a mobile station with an autonomous power supply, which system is characterized in that parameters defining said transmission are configured by authorizing dynamic configuration by the terminal of said parameters defining a discontinuous reception mode of said radiocommunication device when in a standby mode, after static setting of said parameters by said device, as a function of the autonomy of said device, the responsiveness required of said device, and transmission requirements of said terminal, and wherein said parameters comprise DRX parameters, wherein said parameters correspond to DRX parameters defining the conditions of discontinuous reception and of listening to the network by the radiocommunication device when the device is not in a communication mode, and wherein said dynamic configuration of said parameters by said terminal comprises the steps of (i) setting the specific value of each DRX parameter in said terminal, (ii) transmitting said specific values from the terminal to the radiocommunication device, and (iii) starting a location request procedure in said radiocommunication device, in order to communicate the specific values of the DRX parameters to the network from the terminal.

6. A mobile radiocommunication device with an autonomous power supply, for use in a system for transmitting data packets from a terminal to a telecommunication network via said mobile radiocommunication device, said device having an autonomous power supply, which system is characterized in that parameters defining said transmission are configured by authorizing dynamic configuration by said terminal of said parameters defining a discontinuous reception mode of said radiocommunication device when in a standby mode, after static setting of said parameters by said device, as a function of the autonomy of said device, the responsiveness required of said device, and transmission requirements of said terminal, wherein said parameters correspond to DRX parameters defining the conditions of discontinuous reception and of listening to the network by the radiocommunication device when the device is not in a communication mode, and wherein said dynamic configuration of said parameters by said terminal comprises the steps of (i) setting the specific value of each DRX parameter in said terminal, (ii) transmitting said specific values from the terminal to the radiocommunication device, and (iii) starting a location request procedure in said radiocommunication device, in order to communicate the specific values of the DRX parameters to the network from the terminal.

7. A method according to claim 1, wherein said terminal is external of said radiocommunication device.

8. A system according to claim 5, wherein said terminal is external of said radiocommunication device.

9. A radiocommunication device according to claim 6, wherein said terminal is external of said radiocommunication device.

* * * * *